United States Patent [19]
Faller

[11] Patent Number: 5,873,400
[45] Date of Patent: Feb. 23, 1999

[54] TIE-DOWN SYSTEM FOR A RETRACTABLE AWNING

[75] Inventor: Kenneth M. Faller, Thornton, Colo.

[73] Assignee: Carefree/Scott Fetzer Company, Broomfield, Colo.

[21] Appl. No.: 976,742

[22] Filed: Nov. 24, 1997

Related U.S. Application Data

[60] Provisional application No. 60/031,799 Nov. 27, 1996.

[51] Int. Cl.⁶ .................................................. E04F 10/06
[52] U.S. Cl. ............................................... 160/67; 160/46
[58] Field of Search ................................ 160/67, 66, 68, 160/46, 65; 135/88.11, 88.12

[56] References Cited

U.S. PATENT DOCUMENTS

| | | | |
|---|---|---|---|
| 3,327,724 | 6/1967 | Nielsen | 160/46 X |
| 4,640,332 | 2/1987 | Turner | 160/46 |
| 5,171,056 | 12/1992 | Faludy et al. | |
| 5,246,052 | 9/1993 | Homan | 160/67 X |
| 5,531,239 | 7/1996 | Hannah | 135/88.12 X |
| 5,636,675 | 6/1997 | Baka et al. | 160/67 |

*Primary Examiner*—David M. Purol
*Attorney, Agent, or Firm*—Dorsey & Whitney LLP

[57] ABSTRACT

A tie-down system for a retractable awning is positioned within the interior of the roll bar of the awning and includes a tie-down cord that is extendable from the awning for connection to a ground anchoring system. The flexible cord is biased into a retracted position substantially within the roll bar by a spiral spring that is secured at one end to the interior of the roll bar and at another end to a roller that is adapted to be rolled along the length of the roll bar. The roller also has secured thereto, and adapted to be simultaneously wrapped therearound with the spiral spring, a flexible strap, the free end of which is connected to the cord so that the spiral spring and strap cause the anchoring cord to be biased toward a retracted position while allowing the cord to be extended against the bias of the spiral spring to an operative tie-down position.

10 Claims, 6 Drawing Sheets

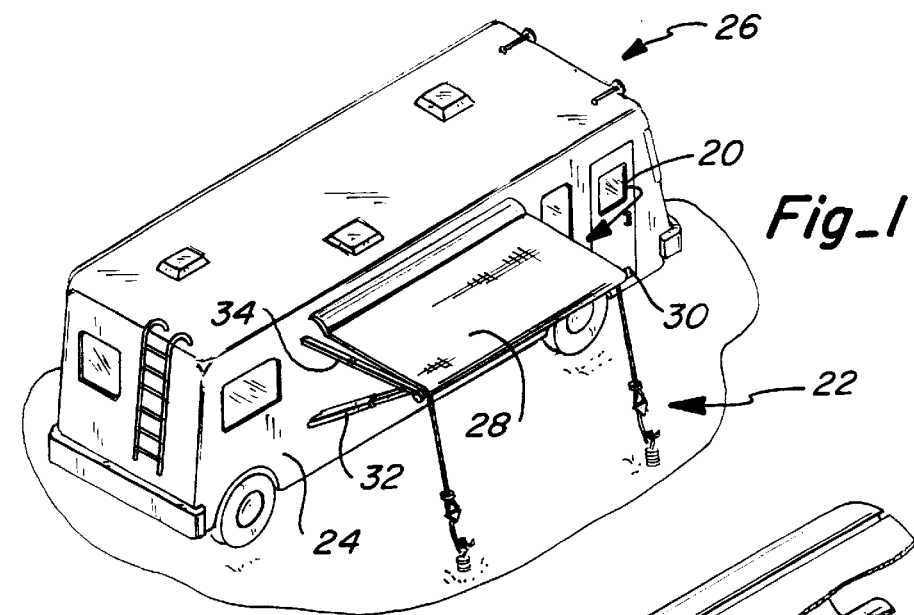
Fig_1
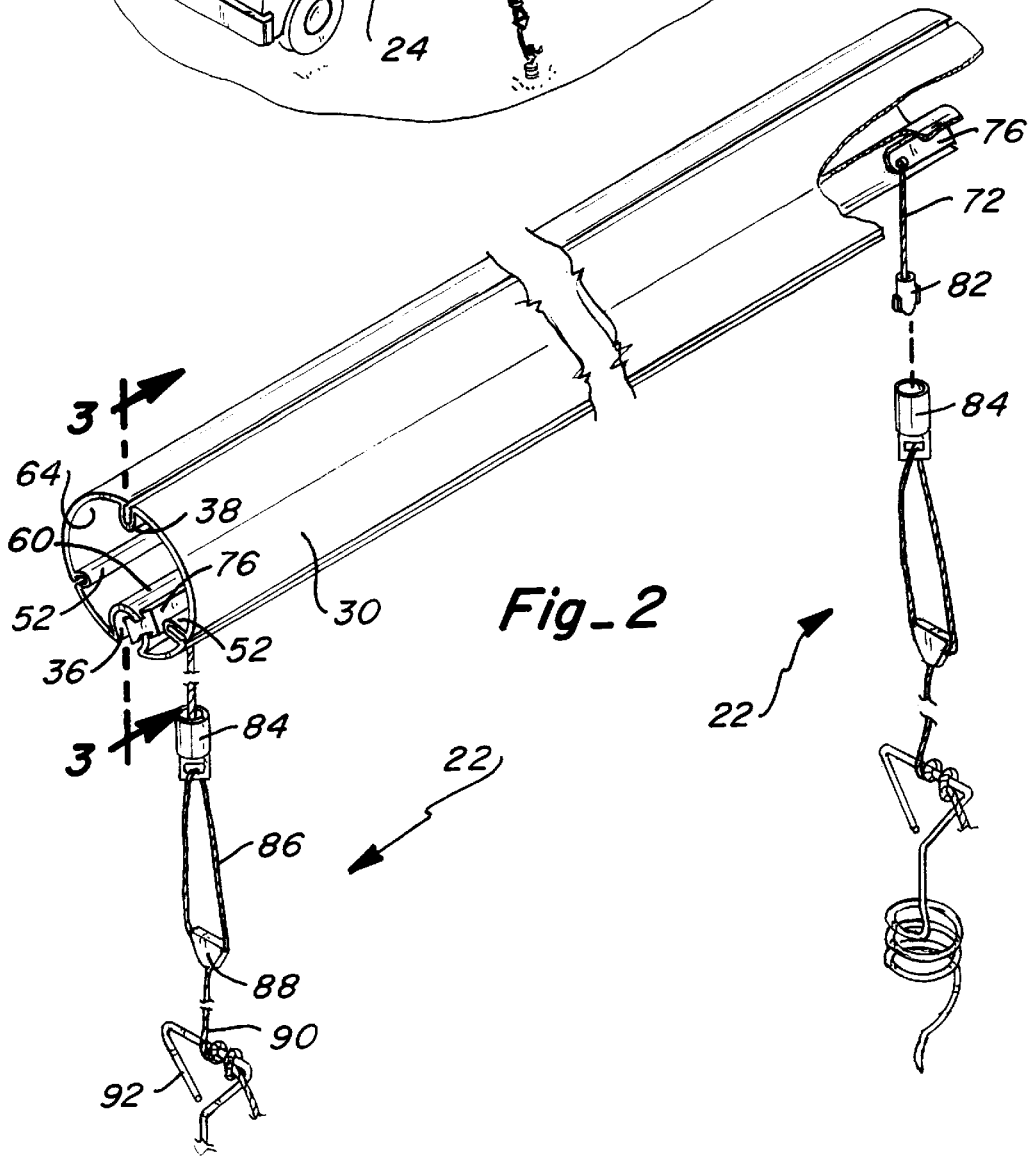
Fig_2

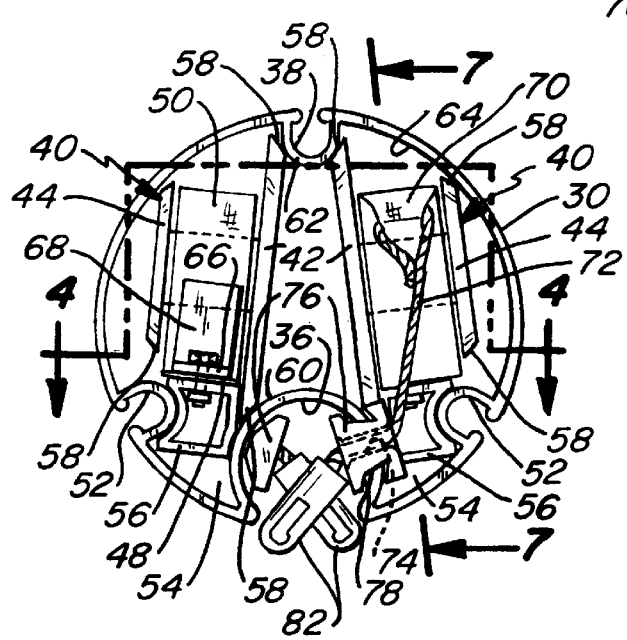
Fig_3
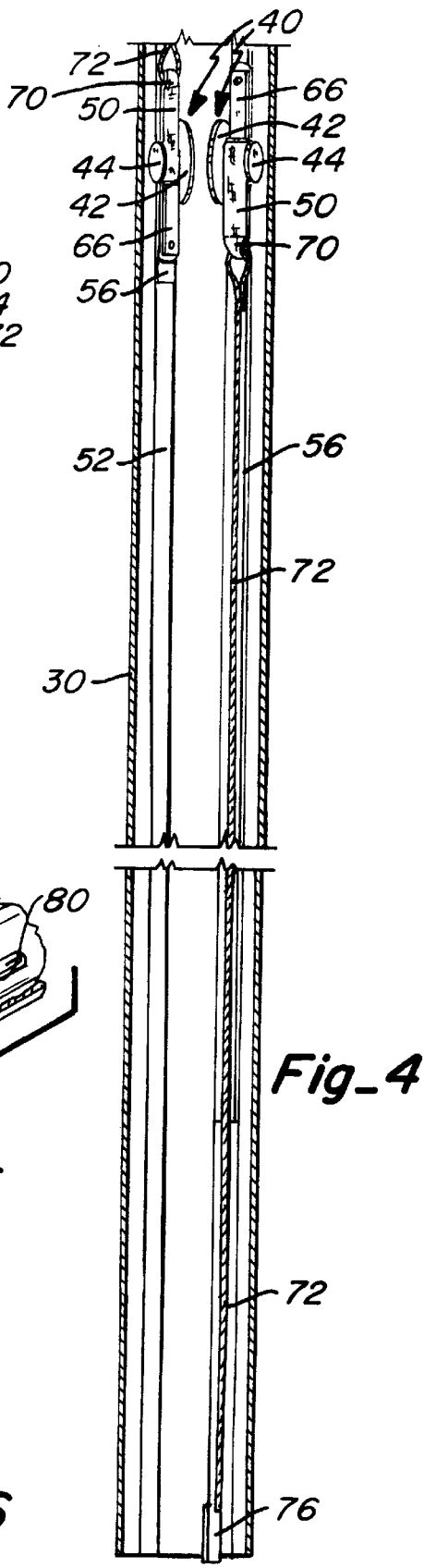
Fig_4
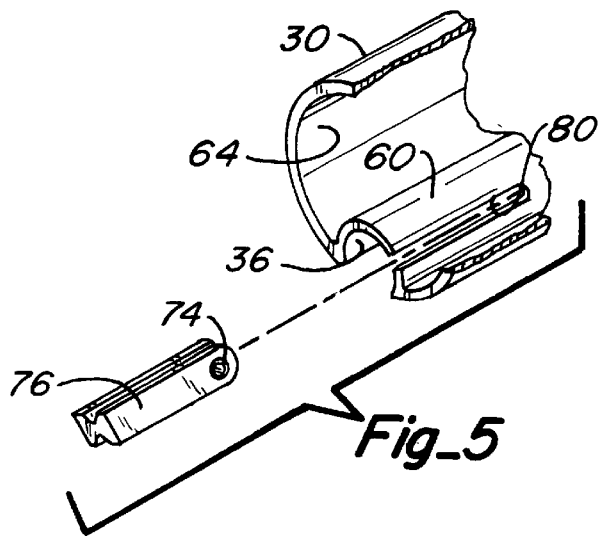
Fig_5
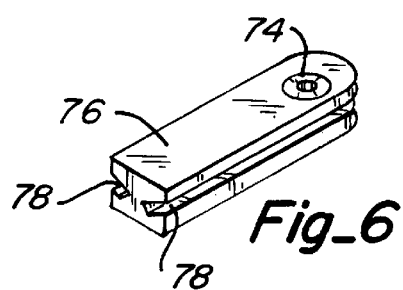
Fig_6

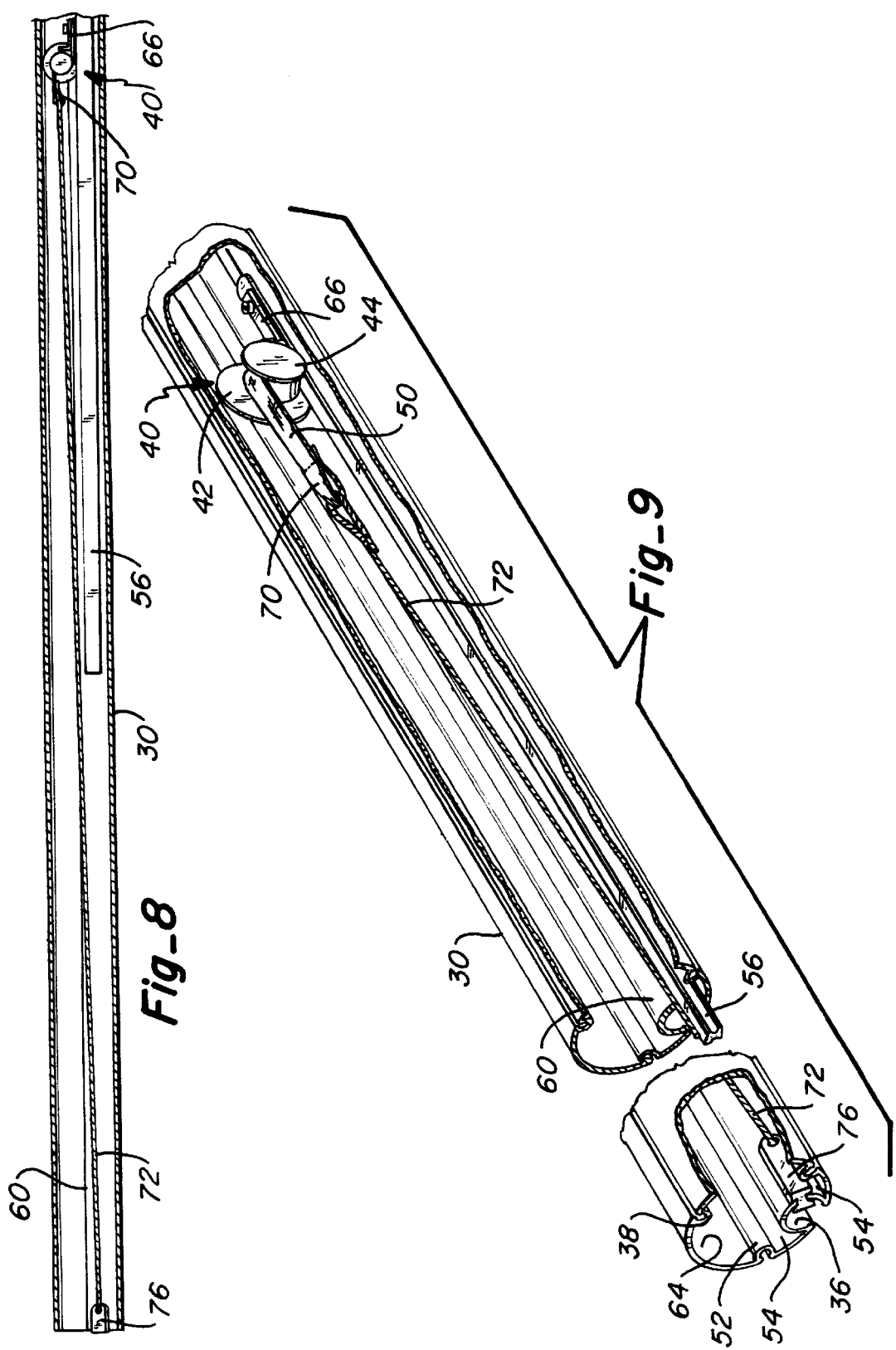

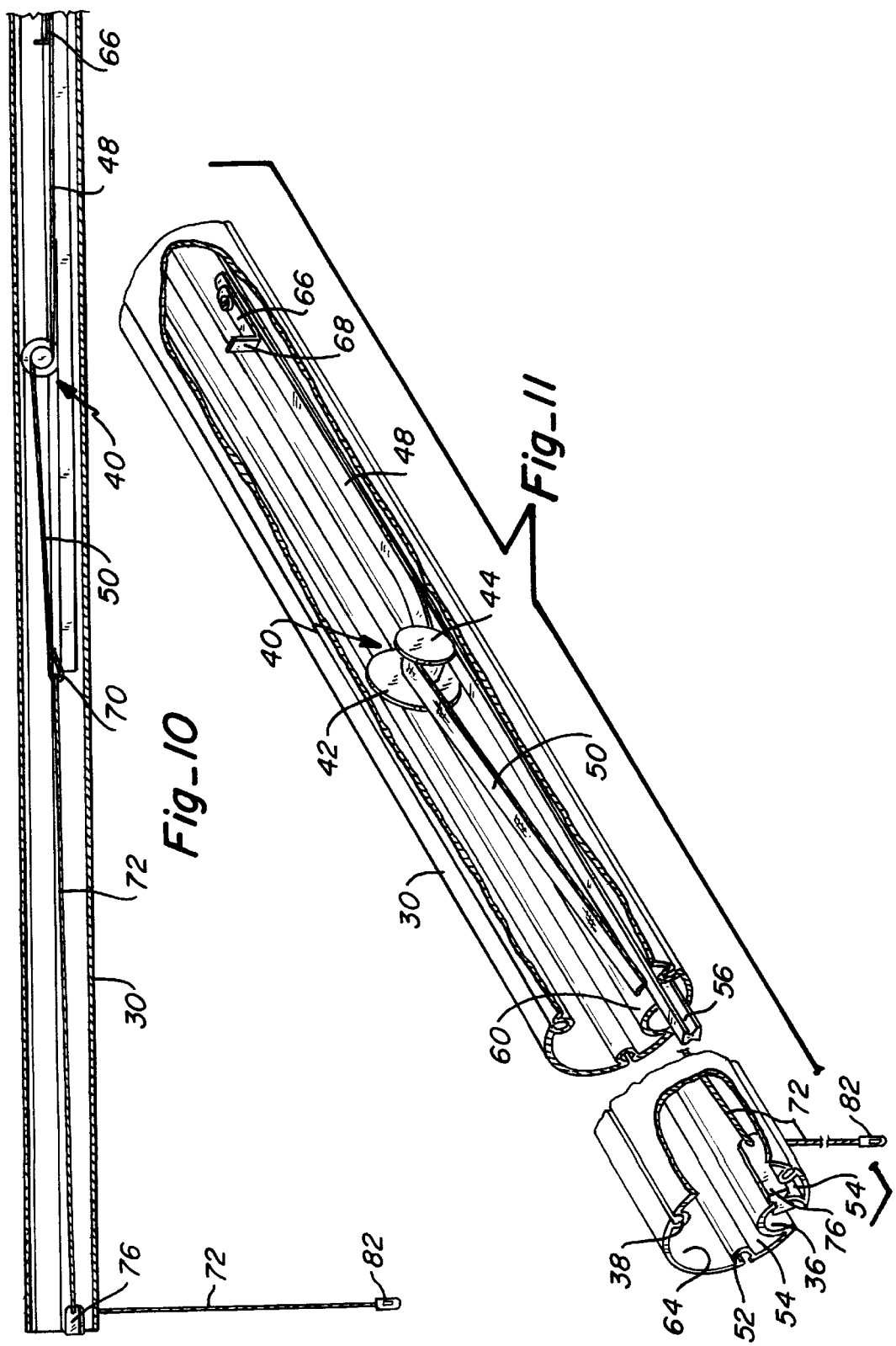

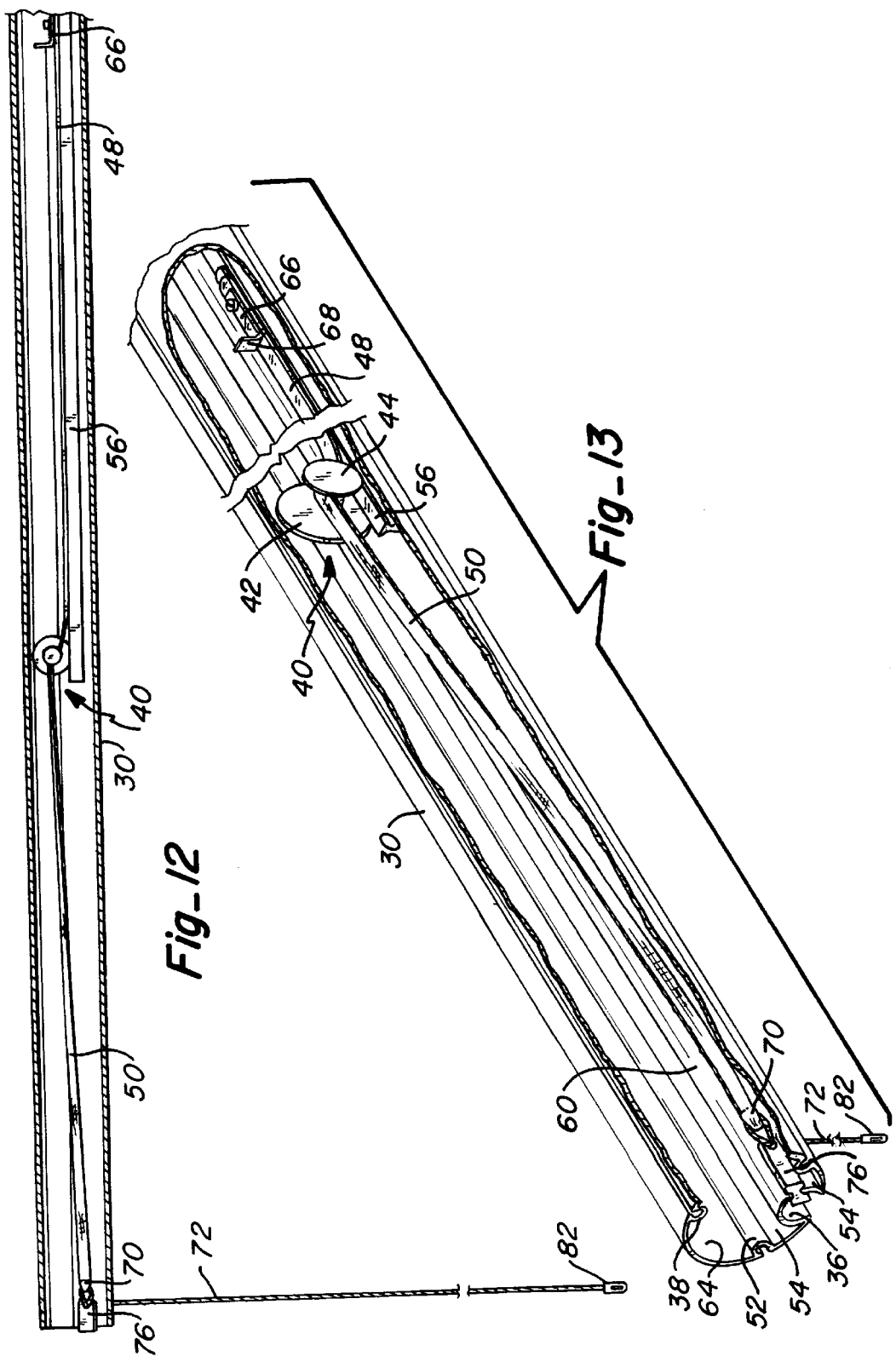

TIE-DOWN SYSTEM FOR A RETRACTABLE AWNING

CROSS REFERENCE TO RELATED APPLICATION

This application claims priority to provisional application Ser. No. 60/031,799 filed Nov. 27, 1996 for Tie-Down System for A Retractable Awning.

BACKGROUND OF THE INVENTION

1. Field of the Invention

The present invention relates generally to retractable awnings, and more particularly to a system for anchoring a retractable awning in its extended position with tie-down straps that are incorporated into the awning.

2. Description of the Known Art

Retractable awnings have been utilized for many years to provide shade or other protection to doorways and windows or to overlie an area adjacent to a building structure such as a patio, deck or the like. More recently, retractable awnings have been mounted on movable structures such as travel trailers, mobile homes, recreational vehicles and the like.

In any of the above uses, however, a prevalent problem has been damage to the awning when it is not anchored in its extendable condition and inclement weather conditions, such as high winds, cause the awning to be unduly stressed.

Prior art systems to prevent damage to the awning while in the extended condition have included tie-down straps that are releasably connectable between the roll bar or lead bar at the leading edge of the awning canopy and the ground. Roll bars or lead bars at the leading edge of the awning canopy typically have channels formed therein in which one end of a tie-down strap can be releasably anchored, with the other being anchored in the ground with auger-type anchors. Some retractable awnings, such as of the type disclosed in U.S. Pat. No. 5,171,056 which is of common ownership with the present application, have incorporated a tie-down strap directly into the roll bar so that it is not releasable therefrom and always accessible upon deployment of the awning. The tie-down strap in the afore-noted U.S. Patent is rolled and unrolled about the roll bar along with the canopy. Accordingly, the tie-down strap is typically deployed along with the canopy and, therefore, if it is not desired for use, it presents an annoyance.

Obviously, the tie-down straps that are removable from the roll bar also present problems in that they must be stored at a remote location and, therefore, are many times difficult to find or may become lost.

It is to overcome the shortcomings in the prior art systems for providing tie-down straps for retractable awnings that the present invention has evolved.

SUMMARY OF THE INVENTION

The present invention relates to a new and improved system for providing tie-down straps in a retractable awning and, particularly, a system wherein the tie-down straps are incorporated into the awning itself so as to form a part thereof and yet be selectively deployable.

According to the present invention, one or two tie-down strap systems can be incorporated into the roll bar or lead bar of the awning and are biased into a retracted condition within the roll bar but can be easily deployed when used.

Each tie-down strap system is identical and if two systems are utilized in one awning, they are mounted in opposite directions within the roll bar so as to be deployable from opposite ends of the roll bar.

Each tie-down system includes a roller about which is simultaneously wrapped an elongated spiral spring and a flexible extension strap. The spiral spring is anchored within the roll bar at one end of the roll bar and wrapped around the hub of the roller in a manner so as to bias the roller toward the anchored connection. The flexible strap is simultaneously wrapped around the hub of the roller such that when the spiral spring is fully coiled about the roller, so is the flexible strap so that each are simultaneously stored on the roller. The free or distal end of the flexible strap has a flexible cord anchored thereto and the flexible cord extends through an opening provided in the roll bar so that the cord is readily accessible to an operator of the awning. As the cord is pulled, the strap is unwound from the roller simultaneously with the spiral spring against the bias of the spiral spring. The free end of the cord is releasably connectable to an anchoring stake, auger or the like that is embeddable in the ground.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 1 is an isometric view looking down on a recreational vehicle having a retractable awning in an extended position with the tie-down system of the present invention being deployed.

FIG. 2 is a fragmentary isometric view of the lead bar of the retractable awning seen in FIG. 1 and with portions broken away to illustrate the components of the tie-down system.

FIG. 3 is an enlarged section taken along line 3—3 of FIG. 2.

FIG. 4 is a fragmentary reduced section taken along line 4—4 of FIG. 3.

FIG. 5 is an exploded isometric fragmentary view of the end of the roll bar used in the awning seen in FIG. 1.

FIG. 6 is an isometric view of an insert mounted on the end of a roll bar as illustrated in FIG. 5.

FIG. 8 is a fragmentary longitudinal section taken through the roll bar illustrating the tie-down system being mounted therein.

FIG. 9 is an enlarged fragmentary isometric view with portions broken away of the roll bar for the awning seen in FIG. 1 illustrating the components of the tie-down system of the present invention.

FIG. 10 is a fragmentary longitudinal section similar to FIG. 8 with the tie-down system in a partially deployed position.

FIG. 11 is a fragmentary isometric with parts broken away of the roll bar similar to FIG. 9 with the tie-down system in a partially deployed position.

FIG. 12 is a fragmentary longitudinal section taken through the roll bar of the awning seen in FIG. 1 with the tie-down system in a more fully deployed position than shown in FIG. 10.

FIG. 13 is a fragmentary isometric with portions removed of the roll bar as shown in FIG. 11 with the tie-down system in a further deployed position.

DESCRIPTION OF THE PREFERRED EMBODIMENT

Figure 7:
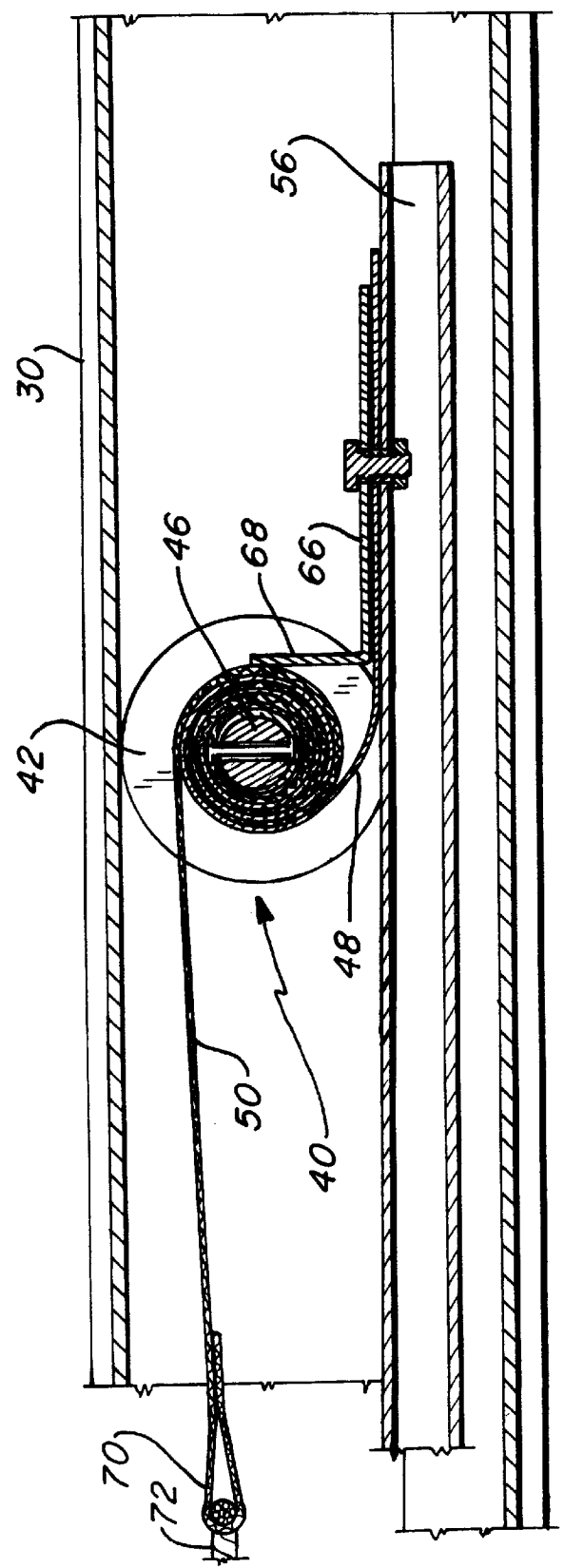
FIG. 7 is an enlarged fragmentary section taken along line 7—7 of FIG. 3.

As can be seen in FIG. 1, a retractable awning 20 incorporating the tie-down system 22 of the present invention can be seen mounted on the side wall 24 of a recreational vehicle 26. The awning is shown in its extended position with the tie-down system of the present invention fully extended and anchoring the awning to the ground on which the vehicle is supported. The retractable awning generally includes an awning sheet 28 having an inner edge anchored to the side wall of the vehicle and an outer edge secured to a lead bar which in the illustrated embodiment is a roll bar 30 about which the awning sheet can be wrapped. A support arm 32 and rafter arm 34 are provided at each end of the awning to mount the awning on the side wall of the vehicle for movement between a retracted position (not shown) and the extended position shown in FIG. 1.

Roll bars 30 used on retractable awnings of the type illustrated typically are extruded cylinders having a substantially cylindrical wall defining a hollow interior extending along the central longitudinal axis of the cylinder and, as best seen in FIGS. 2 and 3, have a plurality of elongated grooves formed in the circumferential surface thereof which are adapted to perform various utilitarian functions. For example, one groove forms the cylindrical wall or location where the outer edge of the awning sheet is secured to the roll bar in a conventional manner. Another groove might serve to anchor an awning valance for decorative purposes. Some roll bars, including the roll bar utilized in the present invention, include a relatively large utility groove with the utility groove conventionally being used to store various items such as auxiliary rafter arms, light fixtures, or the like.

The roll bar 30 used in connection with the present invention does, in fact, include a large utility groove 36 which is diametrically opposite from one of the smaller grooves 38 in the roll bar. The surfaces of the small and large extruded grooves which are presented within the hollow interior of the roll bar provide guide surfaces which cooperate with the tie-down system 22 of the present invention.

As is probably best illustrated in FIGS. 7 through 13, the tie-down system 22 of the present invention has at its heart a roller 40 which has a large circular end plate 42, a relatively small circular end plate 44 and a cylindrical drum 46 integrally connected therebetween. The roller 40 is adapted to roll along the length of the roll bar 30 in a manner to be described later while simultaneously rolling and unrolling therefrom a spiral spring 48 and a flexible strap 50 which could be in the form of conventional webbing material.

As probably best illustrated in FIG. 3, the relatively large utility groove 36 formed in the roll bar 30 is not only diametrically opposite from the small groove 38 but is also spaced a short distance from a pair of small grooves 52 on opposite sides thereof. Channels 54 are defined within the interior of the roll bar between the inward projection of the utility groove 36 and the adjacent small grooves 52. In each channel 54 an elongated tubular insert 56 of substantially square cross section is fixed in position with the insert being adapted to confine, support and control both the spiral spring 48 and the flexible strap 50 when each are unrolled from the roller.

The circular end plates 42 and 44 on the roller are designed, sized and positioned to cooperate with various internal surfaces of the roll bar to facilitate rolling movement of the rollers along the length of the roll bar. As probably best seen in FIG. 3, it will be appreciated that each end plate 42 and 44 is of generally frustoconical configuration so as to define a circumferential beveled surface 58. The beveled surface 58 on the large end plate 42 is adapted to roll along an internal surface 60 of the large utility groove 36 and an internal surface 62 of the diametrically opposite small groove 38. The beveled surface 58 on the small disc 44, on the other hand, is adapted to engage the internal surface of the cylindrical wall 64 of the roll bar 30 so that the roller is confined within the roll bar and can only roll longitudinally along its length.

At one end of the roll bar, the spiral spring 48 is anchored to the tubular insert 56 with a conventional rivet or the like, which also secures an L-shaped bracket 66 having a radially extending end plate 68 adapted to engage the roller 40 when the roller is retracted by the bias of the spiral spring toward its stored position (FIG. 7) at one end of the roll bar. Both the spiral spring 48 and the flexible strap 50 are secured to the cylindrical drum 46 of the roller with the spiral spring projecting substantially longitudinally of the roll bar away from the bottom of the drum and the flexible strap extending substantially longitudinally of the roll bar in the opposite direction from the top of the drum. It will be appreciated that as the roller is rolled away from its stored position at the end of the roll bar, both the spiral spring and the flexible strap are simultaneously unrolled from the roller and, of course, as the roller is rolled in the opposite direction toward its stored end of the roll bar, the flexible strap and the leaf spring are simultaneously rolled upon the drum of the roller. It will also be evident that the spiral spring biases the roller toward its stored position.

The free or distal end 70 of the flexible strap 50 is connected to a flexible cord 72 which extends through a passage 74 in a guide member 76 that has opposing grooves 78 and is received in a slot 80 (FIG. 5) formed in the end of the roll bar 30. An end cap for the roll bar, which is not shown, prevents the guide member 76 from being released.

The flexible cord 72 has a quick release fastener 82 on its free end with the fastener being substantially stored within the utility groove 36 when the tie-down system is retracted, as best seen in FIG. 3. In the preferred embodiment of the invention, the cord 72 has a length substantially equal to the overall length of the roll bar 30 while each of the flexible strap 50 and spiral spring 48 have a length of approximately one-half the length of the roll bar. Accordingly, when the roller 40 is advanced along the roll bar from its stored position at one end thereof to its deployed position near the mid-point of the roll bar, both the spiral spring and flexible strap are unwound from the roller and the flexible cord projects from the guide member away from the roll bar a length approximating the length of the roll bar. Of course, when the system is retracted and the roller is positioned in its stored location shown in FIG. 7, both the strap and the spiral spring are fully wound around the roller and the flexible cord extends interiorly along the full length of the roll bar with the quick release connector seated and confined within the utility slot.

The elongated tubular insert 56 that is positioned in the channel 54 between the utility slot 36 and the adjacent small slot 52 serves to guide, support and confine both the spiral spring 48 and the flexible strap 50 thereby preventing either from being jammed or otherwise prevented from functioning as desired within the interior of the roll bar.

The quick release fastener 82 on the free end of the flexible cord 72 is designed to releasably cooperate with a mating component 84 secured by an endless loop cord 86 to a connector 88. The connector 88 has a free depending cord 90 that in turn is tied to an auger-type anchor 92 which could, of course, be a stake or other form of anchor suitable for being embedded in the ground.

It will, therefore, be appreciated that when the tie-down system 22 is fully deployed so that the flexible cord 72 is extended from one end of the roll bar 30, the quick release fastener 82 can be connected to its mating component 84 to releasably secure the tie-down cord to the ground. To retract the tie-down system, the quick release connector is simply disconnected from its mating component and the cord is allowed to retract into the roll bar due to the bias of the spiral spring 48 causing the roller 40 to roll along the length of the roll bar to its stored position as seen in FIG. 7.

As mentioned previously, while a single system can be utilized, it is preferable that a pair of the tie-down systems as described be positioned within a single roll bar. In this circumstance, the systems would be set up in reverse, as shown in FIGS. 3 and 4, so that a flexible cord from each system would extend from an associated end of the roll bar. In this manner the awning would be anchored to the ground at each end.

Although the present invention has been described with a certain degree of particularity, it is understood that the present disclosure has been made by way of example, and changes in detail or structure may be made without departing from the spirit of the invention as defined in the appended claims.

It is claimed:

1. A tie-down system in a retractable awning having an awning canopy operatively secured along an inner edge to a support surface and secured along an opposite outer edge to a lead bar, said lead bar being supported by a support system for movement away from said support surface when the awning is extended and into adjacent relationship with the support surface when the awning is retracted, said lead bar having a substantially cylindrical wall defining a central longitudinal axis of the lead bar and a hollow interior extending along said longitudinal axis, and a retractable mechanism having a flexible element mounted in said hollow interior of the lead bar for extension from the lead bar to an external location where it can be anchored to stabilize the awning in the extended position.

2. A tie-down system in a retractable awning having an awning canopy operatively secured along an inner edge to a support surface and secured along an opposite outer edge to a lead bar, said lead bar being supported by a support system for movement away from said support surface when the awning is extended and into adjacent relationship with the support surface when the awning is retracted, said lead bar having a hollow interior and a retractable mechanism having a flexible element mounted in the hollow interior of the lead bar for extension from the lead bar to an external location where it can be anchored to stabilize the awning in the extended position, said retractable mechanism including a resilient member biasing said flexible element toward a retracted position in the hollow interior of the lead bar.

3. The tie down system of claim 2 wherein said retractable mechanism further includes a flexible strap and a roller, said flexible strap being anchored at one end to said roller and attached to said flexible element at its other end, said resilient member biasing said roller to a retracted position in which said flexible strap is wrapped around said roller and said flexible element is substantially disposed within said hollow interior of the lead bar and wherein said flexible element can be extended from said roll bar by pulling the flexible element causing the flexible strap to be unrolled from the roller against the bias of said resilient member.

4. The tie down system of claim 3 wherein said lead bar has inwardly protruding longitudinally extending surfaces defining guide surfaces for guiding rolling movement of the roller.

5. The tie down system of claim 3 wherein said lead bar has at least one groove formed in an external surface, said groove defining a wall that protrudes into the hollow interior of the lead bar with said guide surfaces being on said wall.

6. The tie down system of claim 5 wherein said flexible element has a free end with the free end being disposed in said groove when the roller is in the retracted position whereby said free end is accessible to an operator of the awning.

7. The tie down system of claim 5 wherein there are a plurality of grooves formed in said external surface and said guide surfaces are on more than one of said walls of the groove.

8. The tie down system of claim 3 wherein said resilient member is a spiral spring.

9. The tie down system of claim 8 wherein said spiral spring has a first end and a second end, said first end being anchored to said lead bar and said second end being anchored to said roller such that when said roller is in the retracted position, the spiral spring is wound therearound.

10. The tie down system of claim 9 wherein said spiral spring and said flexible strap are wrapped around said roller in alternating lawyers when said roller is in the retracted position.

* * * * *

UNITED STATES PATENT AND TRADEMARK OFFICE
CERTIFICATE OF CORRECTION

PATENT NO.   : 5,873,400
DATED        : Feb. 23, 1999
INVENTOR(S)  : Kenneth M. Faller It is certified that error appears in the above-identified patent and that said Letters Patent is hereby corrected as shown below:

Col. 6, line 46
(claim 10)          The word "lawyers" should be --layers--.

Signed and Sealed this

Thirteenth Day of July, 1999

Attest:

Attesting Officer

Q. TODD DICKINSON

Acting Commissioner of Patents and Trademarks